United States Patent
Wu et al.

(10) Patent No.: US 12,478,071 B2
(45) Date of Patent: Nov. 25, 2025

(54) UV STERILIZATION FRESH-KEEPING BOX

(71) Applicant: SWANSON TECHNOLOGIES CORPORATION, Taipei (TW)

(72) Inventors: Tung-Yang Wu, Taipei (TW); Shih-Yi Chang, Taipei (TW); Hsuan-Hui Wang, Taipei (TW)

(73) Assignee: SWANSON TECHNOLOGIES CORPORATION, Taipei (TW)

( * ) Notice: Subject to any disclaimer, the term of this patent is extended or adjusted under 35 U.S.C. 154(b) by 412 days.

(21) Appl. No.: 18/157,628

(22) Filed: Jan. 20, 2023

(65) Prior Publication Data

US 2023/0232871 A1    Jul. 27, 2023

(30) Foreign Application Priority Data

Jan. 21, 2022    (TW) .................................. 111102559

(51) Int. Cl.
| | |
|---|---|
| *A23B 2/53* | (2025.01) |
| *A23B 2/00* | (2025.01) |
| *B65D 81/24* | (2006.01) |
| *H02J 7/00* | (2006.01) |

(52) U.S. Cl.
CPC ................ *A23B 2/53* (2025.01); *A23B 2/003* (2025.01); *B65D 81/24* (2013.01); *H02J 7/0047* (2013.01)

(58) Field of Classification Search
CPC . A23B 2/53; A23B 2/003; B65D 81/24; H02J 7/0047
See application file for complete search history.

(56) References Cited

U.S. PATENT DOCUMENTS

2021/0283288 A1*    9/2021    Dunn ...................... B65F 1/062

FOREIGN PATENT DOCUMENTS

| CN | 212282241 U | 1/2021 |
|---|---|---|
| CN | 213623373 U | 7/2021 |

* cited by examiner

*Primary Examiner* — Nicole M Ippolito
(74) *Attorney, Agent, or Firm* — MUNCY, GEISSLER, OLDS & LOWE, P.C.

(57) ABSTRACT

The present invention discloses a UV sterilization fresh-keeping box, including an accommodating box and a UV sterilization device removably disposed on a top side of the accommodating box. The accommodating box includes a box body with a storage space, and a lid disposed on the box body. The lid has a light transmission part to allow UV light to pass through, and a first assembling part disposed on a peripheral side of the light transmission part. The UV sterilization device includes a case, a UV module disposed in the case, a control module electrically connected to the UV module, and a second assembling part disposed on a bottom side of the case. The UV sterilization device is mounted onto the lid by combining the second assembling part with the first assembling part. The UV module is controlled by the control module to emit UV light towards the light transmission part, so as to sterilize the storage space.

9 Claims, 6 Drawing Sheets

UV STERILIZATION FRESH-KEEPING BOX

FIELD OF TECHNOLOGY

The present invention relates to a UV sterilization fresh-keeping box, in particular to a UV sterilization fresh-keeping box with a removable UV sterilization device.

BACKGROUND

The development of industrial technology has brought people a more convenient life, however, deterioration is also caused because of the influence of industrial technology. The water, air and soil in the environment are polluted and damaged, leading to pollution or diseases to various animals and plants. Therefore, a healthy diet has become a topic that modern people pay considerable attention to.

Due to environmental pollution and damage to soil and drinking water sources, people need to wash or preliminarily treat all kinds of food before eating to remove dirt, impurities or odors from the food, and then heat and season food that needs to be cooked, so as to get clean and delicious dishes. However, the environmental space is full of bacteria. Whether it is fruits and vegetables that may be eaten raw or cooked dishes, if they are not eaten up in real time, bacteria may begin to breed and multiply in the food or dishes as the time increases due to the environment temperature, or the status of storage and other factors, resulting in spoilage or rotting.

SUMMARY

According to an existing sterilization manner of irradiating food with UV light, in order to improve the utilization rate of UV light, structures, material or devices that may emit UV light may be disposed inside a container for sterilization. However, the structures, material or devices disposed inside the container may make direct contact with food, which may cause safety and health concerns. In addition, if juice of the food seeps into the structures, material or devices, the risk of use may be increased. In view of the above-mentioned problems in the prior art, the inventor of the subject application believes that a UV device capable of effectively preserving and sterilizing food is required.

The primary objective of the present invention is to provide a UV sterilization fresh-keeping box, including an accommodating box and a UV sterilization device. The accommodating box includes a box body with a storage space, and a lid disposed on the box body. The lid has a light transmission part to allow UV light to pass through, and a first assembling part disposed on a peripheral side of the light transmission part. The UV sterilization device is removably disposed on a top side of the accommodating box. The UV sterilization device includes a case, a UV module disposed in the case, a control module electrically connected to the UV module, and a second assembling part disposed on a bottom side of the case. The UV sterilization device is mounted onto the lid by combining the second assembling part with the first assembling part. The UV module is controlled by the control module to emit UV light towards the light transmission part, so as to sterilize the storage space.

Further, the light transmission part is made of a cyclic block copolymer (CBC).

Further, the UV module includes a light panel, at least one UV LED electrically disposed on the light panel, and a light transmission sheet disposed in a UV light emitting direction of the UV LED.

Further, the light transmission sheet is made of a cyclic block copolymer (CBC).

Further, the UV LED is a UVC LED.

Further, a wavelength of the UV light ranges from 220 nm to 280 nm.

Further, the UV sterilization device further includes a tilt sensor electrically connected to the control module, the tilt sensor outputs an indication signal when detecting that the lid tilts from a flat state to a default angle, and the control module outputs a corresponding control signal to close the UV module according to the indication signal.

Further, the control module includes a control circuit board, a timer electrically connected to the control circuit board, a touch button, and a status indicator, the touch button and the status indicator are disposed on a top side of the case, the timer records press time of the touch button and outputs an indication signal according to the press time, and the control module outputs a corresponding control signal according to the indication signal to turn on, turn off or control the UV module and the status indicator.

Further, the control module includes a rechargeable battery electrically connected to the control circuit board, an electrical port, and a charging indicator, the electrical port and the charging indicator are disposed on one side of the case, an external power supply is electrically connected to the electrical port to introduce power to the rechargeable battery, and the control module outputs a control signal to turn on the charging indicator.

Further, the rechargeable battery is a lithium battery.

Compared with the prior art, the present invention has the following advantages:

According to the present invention, the removable UV sterilization device is combined to the top side of the accommodating box, and sterilizes an object in the accommodating box without contact, thus ensuring food hygiene; and the UV sterilization device can be removed when the accommodating box is cleaned, thus preventing electronic components from getting wet.

Further, the tilt sensor disposed inside the UV sterilization device outputs the indication signal when the lid is converted from the flat state to tilting by a preset angle, and the control module of the UV sterilization device outputs the corresponding control signal to close the UV module according to the indication signal, so as to avoid UV irradiation to a human body when the lid is opened or when the entire fresh-keeping box tilts.

DESCRIPTION OF THE EMBODIMENTS

The detailed description and technical content of the present invention are now described below in conjunction with the accompanying drawings. Furthermore, for the convenience of illustration, the drawings of the present invention are not necessarily drawn to the actual scale, and the drawings and their scales are not intended to limit the scope of the present invention, as described herein.

Figure 1:
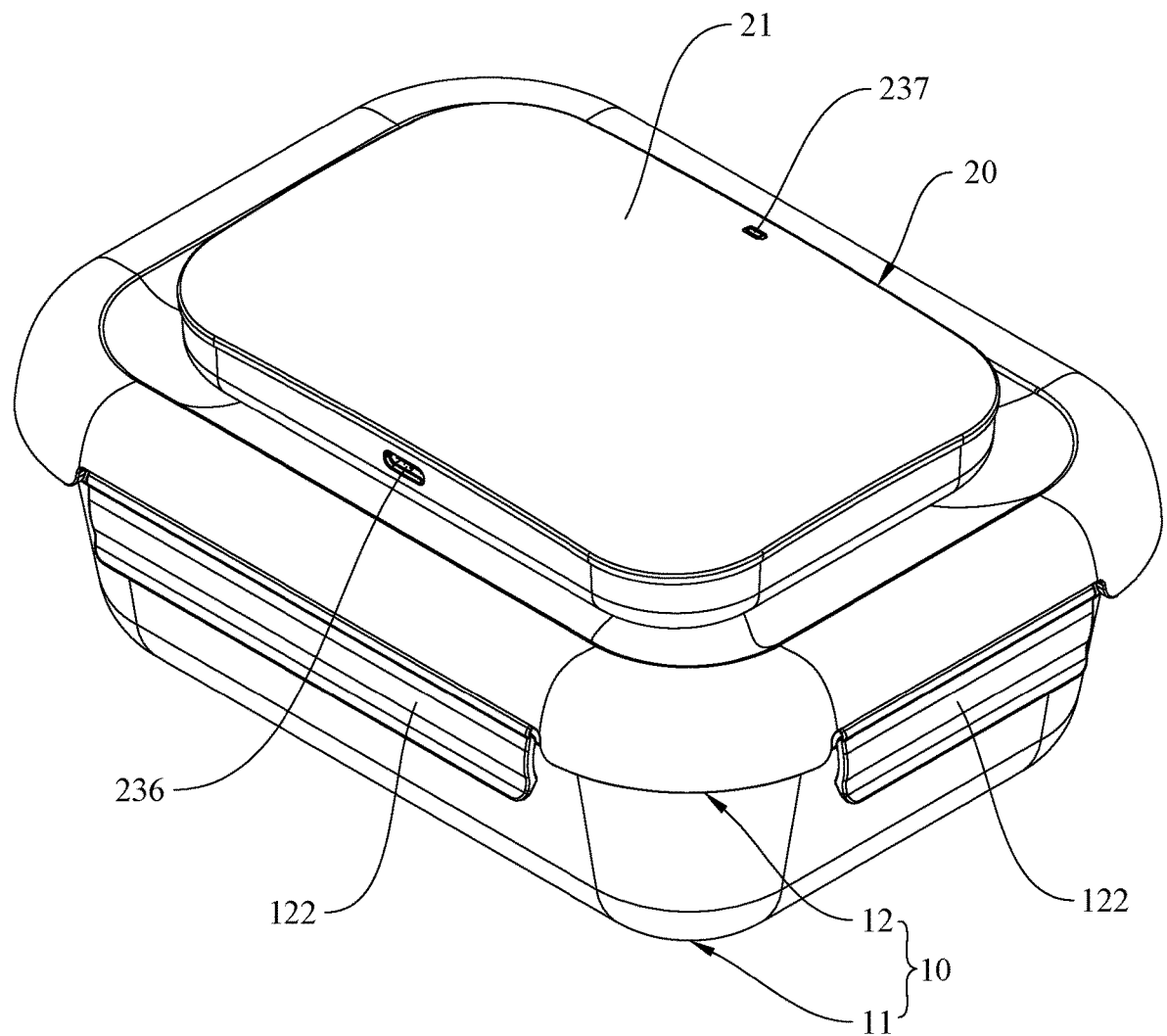
FIG. 1 is a schematic external view of a UV sterilization fresh-keeping box according to the present invention.

Please refer to FIG. 1 for a schematic external view of a UV sterilization fresh-keeping box according to the present invention, as shown in the figure.

Figure 5:
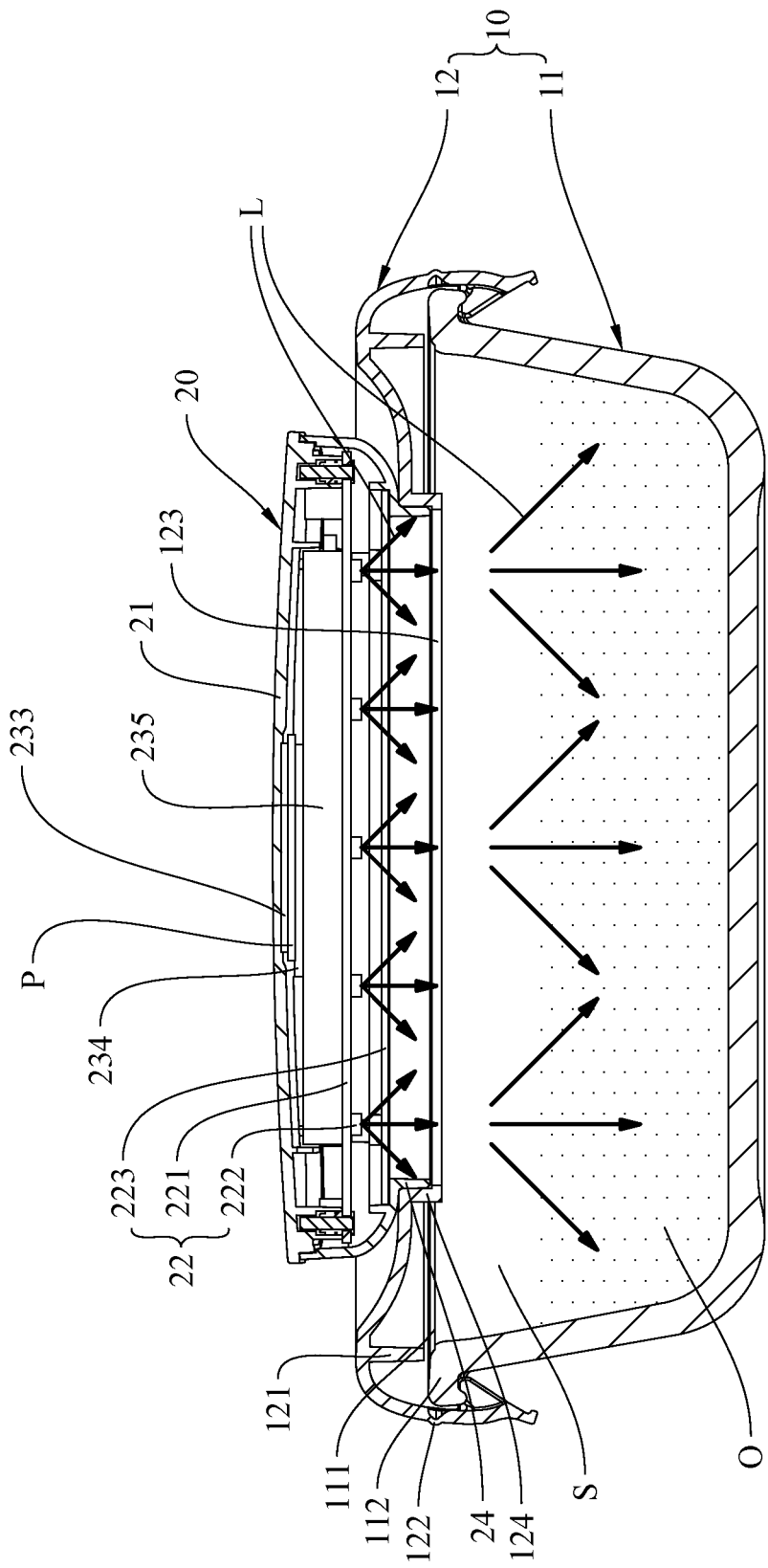
FIG. 5 is a first schematic diagram of a use state of a UV sterilization fresh-keeping box according to the present invention.

The present invention discloses a UV sterilization fresh-keeping box 100. The UV sterilization fresh-keeping box 100 includes an accommodating box 10 and a UV sterilization device 20. The UV sterilization device 20 is disposed on a top side of the accommodating box 10. The UV sterilization device 20 emits UV light into the accommodating box 10 to sterilize an object O (as shown in FIG. 5) in the accommodating box 10. The object O is, for example, but not limited to, solid, liquid or semi-solid food or dishes.

Figure 2:
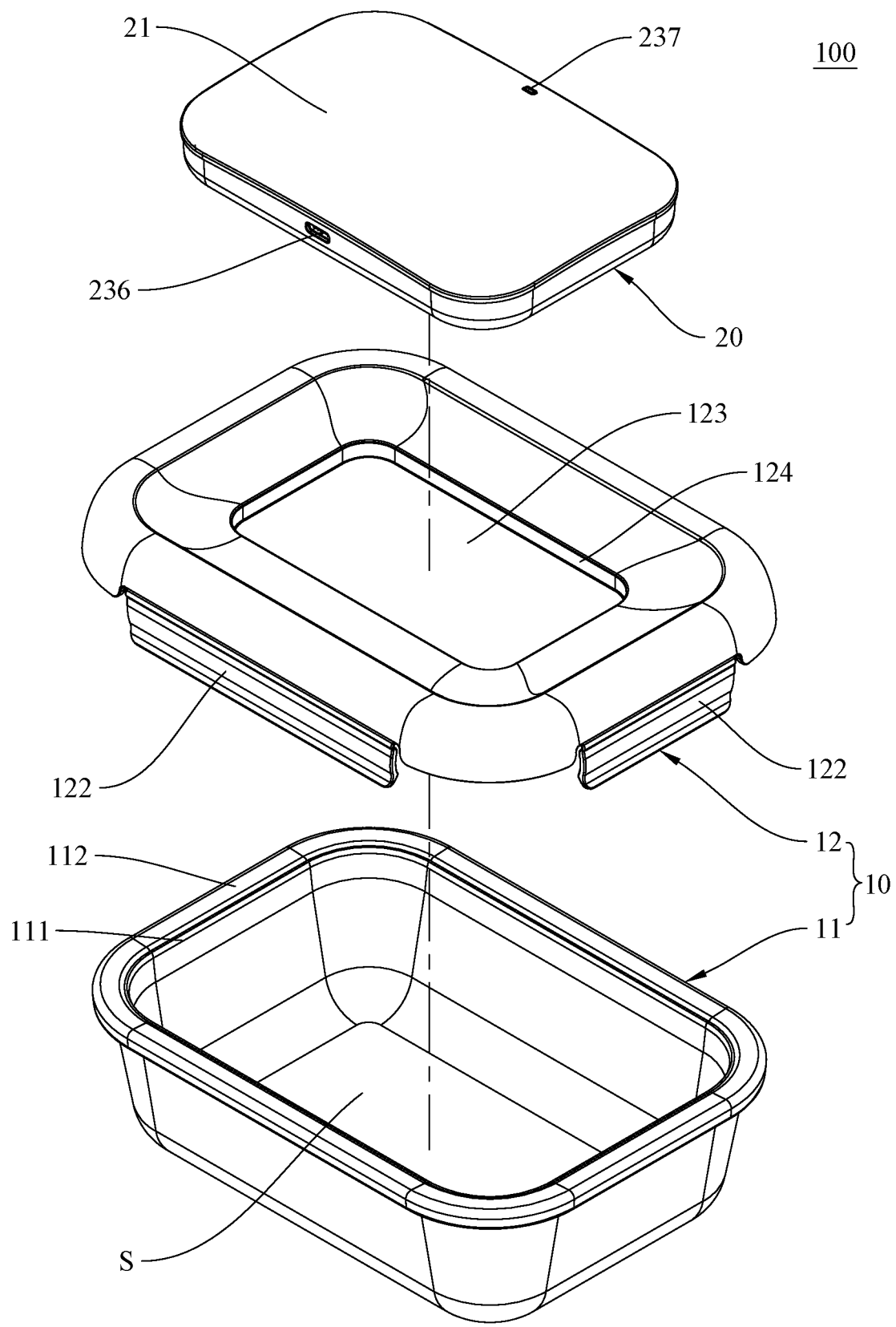
FIG. 2 is a schematic exploded view of a UV sterilization fresh-keeping box according to the present invention.
Figure 3:
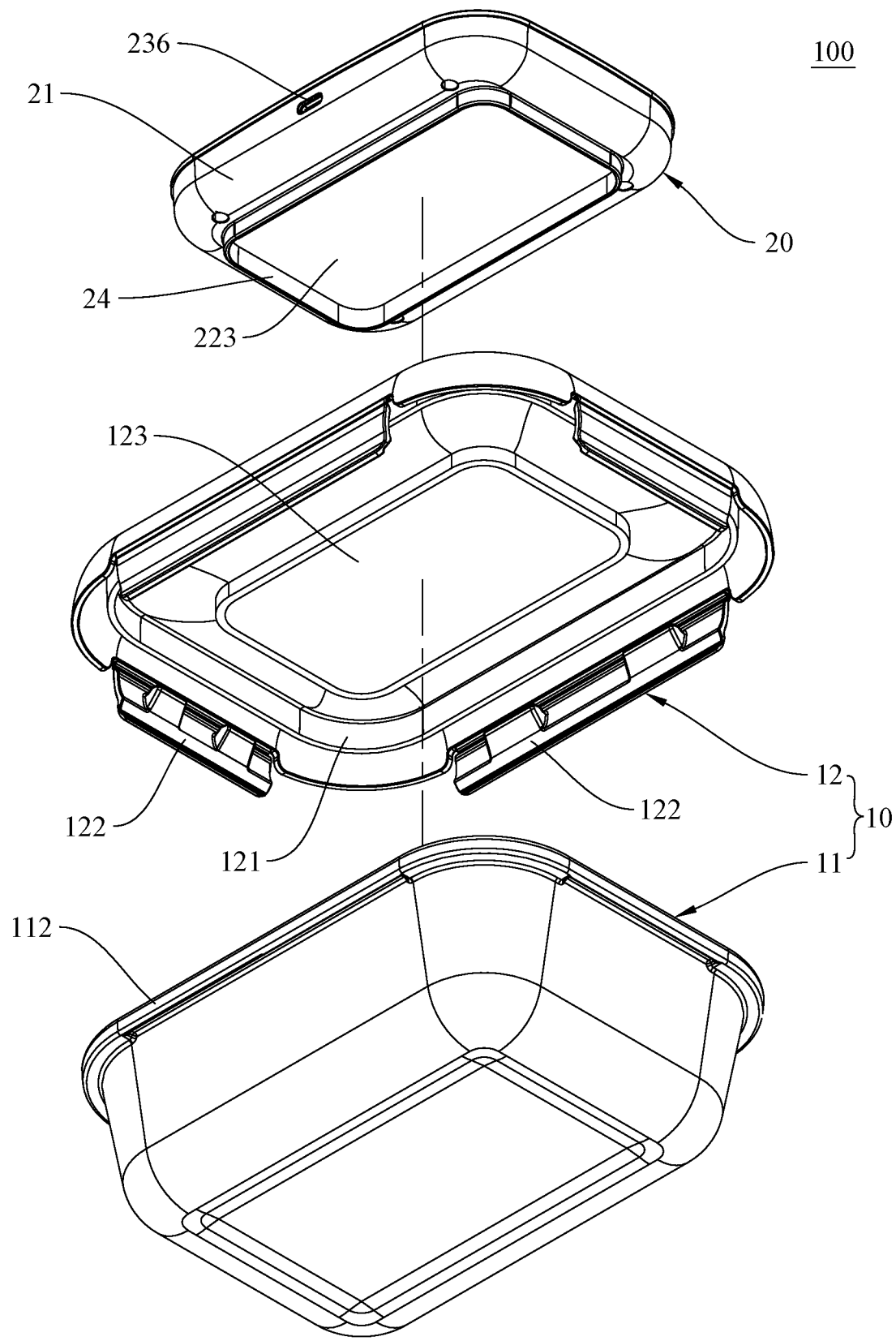
FIG. 3 is a schematic exploded view of a UV sterilization fresh-keeping box from another perspective according to the present invention.

Please also refer to FIG. 2 and FIG. 3 for schematic exploded views of the UV sterilization fresh-keeping box from different perspectives according to the present invention, as shown in the figures.

The accommodating box 10 includes a box body 11 with a storage space S, and a lid 12 disposed on the box body 11. The box body 11 is made of, for example, but not limited to, transparent, translucent or opaque material. The present invention does not intend to limit the volume of the storage space S actually used for containing the object O (as shown in FIG. 5), which is described herein first.

An opening 111 is provided in an upper side of the box body 11. The lid 12 is removably disposed at the opening 111 of the box body 11. A sealing part 121 is disposed in a position, corresponding to the opening 111, of the lid 12. The object O is taken out by removing the lid 12 from the box body 11, or sealed by sealing the box body with the lid. The lid 12 is of, for example, but not limited to, a buckle structure, an embedded structure, or any other structure for combining the lid 12 onto the box body 11. The buckle structure is as shown in FIG. 1 to FIG. 3, an edge of the opening 111 of the box body 11 extends outwards to form a clamping ring 112, elastic buckles 122 buckled to the clamping ring 112 are disposed on a peripheral side of the lid 12, and the elastic buckles 122 may be disposed on four sides or two opposite sides of the periphery of the lid 12. As for the embedded structure, for example, the edge of the opening 111 of the box body 11 extends outwards to form the clamping ring 112, and a groove (not shown) corresponding to the clamping ring 112 in shape and size and being slightly smaller than the clamping ring is provided in one side, facing the box body 11, of the lid 12, such that the clamping ring 112 is embedded into the groove. The sealing part 121 is, for example, but not limited to, a rubber ring, rubber pad or any other structure disposed inside the lid 12 and corresponding to the opening 111 in size, shape and position to prevent the object O from leaking.

The lid 12 has a light transmission part 123. The light transmission part 123 may be made of any UV penetrable material, such as quartz and plastic, preferably, a circular block copolymer (CBC). If the light transmission part 123 is made of the CBC, the problems of aging, embrittlement or yellowing caused by long-term UV exposure can be relieved, a normal light transmission effect of the light transmission part 123 can be ensured, and the service life of the light transmission part 123 can be prolonged.

A first assembling part 124 is disposed on the peripheral side of the light transmission part 123 of the lid 12 for the UV sterilization device 20 to be removably disposed onto the top side of the accommodating box 10. The UV sterilization device 20 is disposed on the top side of the lid 12 through the first assembling part 124, so as to achieve a UV sterilization effect for the interior of the accommodating box 10. The specific implementation of the first assembling part 124 will be described in detail in the following paragraphs, which is stated herein first.

Figure 4:
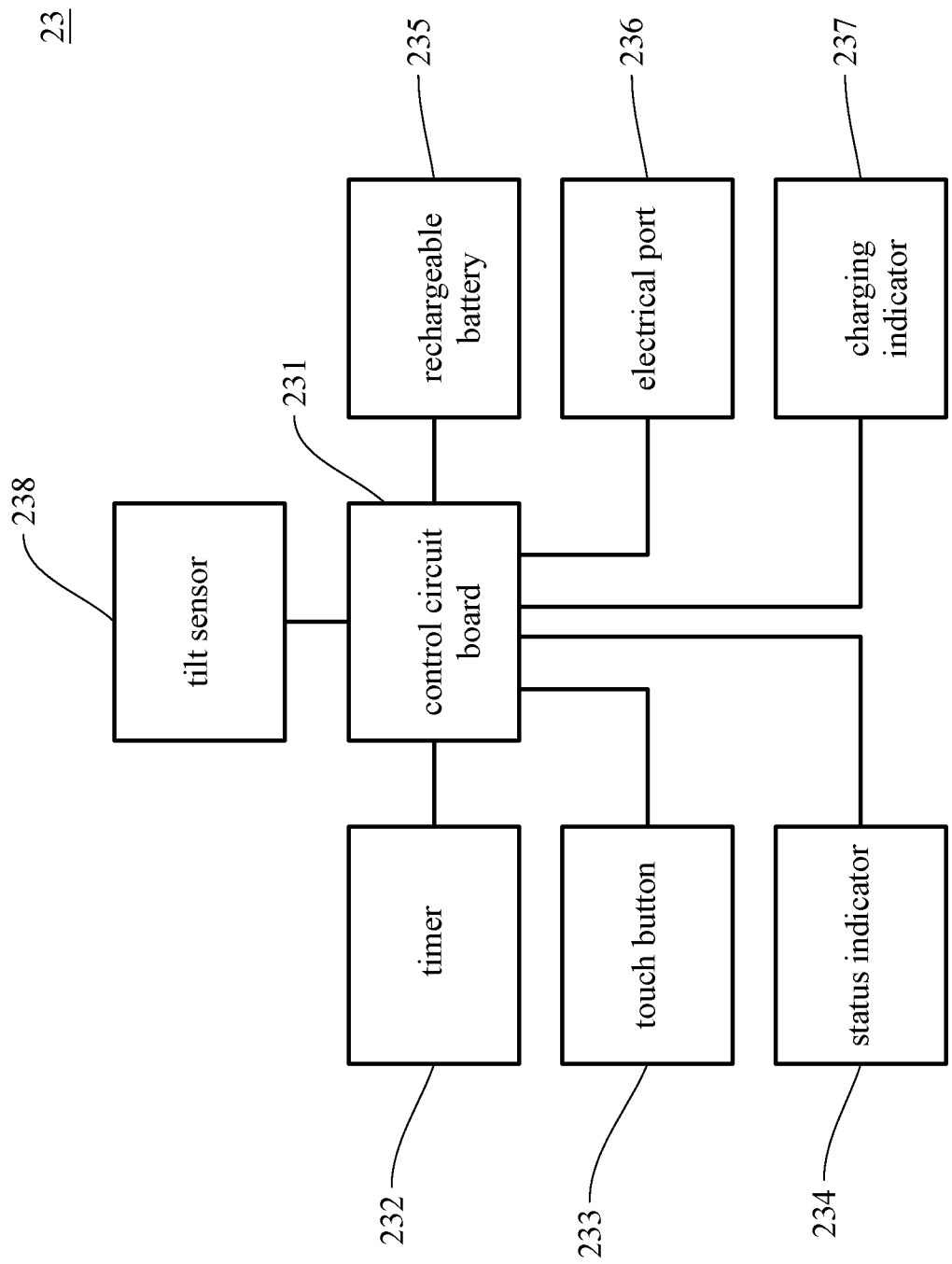
FIG. 4 is a schematic block diagram of a control module according to the present invention.

The UV sterilization device 20 includes a case 21, a UV module 22 disposed in the case 21, a control module 23 (as shown in FIG. 4) electrically connected to the UV module 22 (as shown in FIG. 5), and a second assembling part 24 disposed on a bottom side of the case 21. The UV sterilization device 20 is removably mounted on the lid 12 by combining the second assembling part 24 with the first assembling part 124. The UV sterilization device 20 is controlled by the control module 23 to emit UV light towards the light transmission part 123, and the UV light passes through the light transmission part 123 to irradiate the object O in the storage space S, so as to achieve a sterilization effect for the object O. The specific implementation of the second assembling part 24 will be described in detail in the following paragraphs, which is stated herein first.

The first assembling part 124 of the accommodating box 10 and the second assembling part 24 of the UV sterilization device 20 may be of a removable embedded structure, a rotary fixing structure, a clamped fixing structure, or any other structure or manner for mounting the UV sterilization device 20 to or removing the UV sterilization device from the top side of the accommodating box 10, which is not limited in the present invention, and is stated herein first. In practical use, the accommodating box 10 is combined with the UV sterilization device 20 to realize the function of sterilizing the accommodating box 10, and the interior of the box body 11 is sterilized by UV light passing through the lid 12 without making contact with the UV sterilization device 20, such that the object O can be prevented from being polluted, and food sanitation is ensured. On the other hand, when separated from the UV sterilization device 20, the accommodating box 10 can be used separately, and can also be cleaned independently to avoid the UV sterilization device 20 from being get wet, thus ensuring proper functioning of electronic components of the UV sterilization device 20.

In one embodiment, as shown in FIG. 2 to FIG. 3, the embedded structure may be that, for example, the first assembling part 124 is a groove provided in a top side of the lid 12, the second assembling part 24 is a convex ring disposed on a bottom side of the case 21, the UV sterilization device 20 is mounted onto the top side of the accommodating box 10 by embedding the convex ring into the groove, or, the UV sterilization device 20 may be removed from the accommodating box 10 by disengaging the convex ring from the groove.

In another embodiment, the rotary fixing structure may be that, for example, the first assembling part 124 is an internal thread (or groove) (not shown) provided on the top side of the lid 12, the second assembling part 24 is an external thread (or clamping strip) (not shown) provided on the top side of the case 21, the UV sterilization device 20 is mounted onto the top side of the accommodating box 10 by locking fit between the internal thread (or groove) and the external thread (or clamping strip), or, the UV sterilization device 20 may be removed from the accommodating box 10 by disengaging the internal thread (or groove) from the external thread (or clamping strip).

In still another embodiment, the clamped fixing structure may be that, for example, the first assembling part 124 is a mortise (not shown) provided in the top side of the lid 12, the second assembling part 24 is a tenon disposed on the bottom side of the case 21, the UV sterilization device 20 is mounted onto the top side of the accommodating box 10 by making the tenon penetrate into the mortise for clamping, or, the UV sterilization device 20 may be removed from the accommodating box 10 by disengaging the tenon from the mortise.

Please also refer to FIG. 4 and FIG. 5. FIG. 4 is a schematic block diagram of the control module according to the present invention. FIG. 5 is a first schematic diagram of a use state of the UV sterilization fresh-keeping box according to the present invention, as shown in the figures.

The UV module 22 includes a light panel 221, at least one UV LED 222 electrically disposed on the light panel 221, and a light transmission sheet 223 disposed in a UV light emitting direction of the UV LED 222. Divergent UV light L emitted by the UV LED 222 passes through the light transmission sheet 223 and the light transmission part 123 in sequence to irradiate into the box body 11, such that the object O in the storage space S is irradiated with the UV light, and the effect of sterilization on the object O is realized.

The UV LED 222 may be a UVC LED. At least one UVC LED is disposed on the light panel 221 to emit UV light L with a wavelength ranging from 220 nm to 280 nm towards the box body 11. The type, number and arrangement of the UV LED 222 are not limited in the present invention, which is stated herein first.

The light transmission sheet 223 may be made of any UV penetrable material, such as quartz and plastic, preferably, a circular block copolymer (CBC). If the light transmission sheet 223 is made of the CBC, the problems of aging, embrittlement or yellowing caused by long-term UV exposure can be relieved, a normal light transmission effect of the light transmission sheet 223 can be ensured, and the service life of the light transmission sheet 223 can be prolonged.

A heat dissipation plate (not shown) is disposed on one side, opposite to the UV LED 222, of the light panel 221. The heat dissipation plate is made of, for example, but not limited to, aluminum, aluminum alloy, copper, copper alloy, or other material conducive to heat dissipation, thus reducing heat generated during operation of the UV LED 222, and ensuring the proper functioning of the electronic components inside the case 21.

The control module 23 includes a control circuit board 231, a timer 232 electrically connected to the control circuit board 231, a touch button 233, and a status indicator 234. In this embodiment, the touch button (for example, but not limited to, an ITO film) 233 and the status indicator 234 are disposed on the top side of the case 21. The status indicator 234 is disposed below the touch button 233 and provides light rays towards the touch button 233, which allows a user to perform operation above the accommodating box 10 and provides prompts to the user. In another embodiment, the touch button 233 and the status indicator 234 may be disposed in different positions of the top side of the case 21, or disposed on the top side and/or the circumferential side of the case 21 respectively, which also allows the user to perform operation and provides prompts to the user.

A light shielding plate P is disposed above the status indicator 234. The light shielding plate P has a hollowed-out area (not shown). The hollowed-out area is shaped as, for example, but not limited to, a pattern, character and/or figure. When the status indicator 234 is turned on, visible light passes through the hollowed-out area to enhance the visual effect.

The control module 23 includes a rechargeable battery 235 electrically connected to the control circuit board 231, an electrical port 236, and a charging indicator 237. The rechargeable battery 235 is, for example, but not limited to, a lithium battery, a nickel-cadmium battery, a nickel-metal hydride battery, or other battery types capable of being charged and discharged multiple times. The electrical port 236 and the charging indicator 237 are disposed on one side of the case 21, and are, for example, but not limited to, disposed on the top side or the circumferential side of the case 21 separately or jointly, which allows the user to charge the UV sterilization device 20, and provides prompts to the user.

In order to display visible light emitted by the status indicator 234 and/or the charging indicator 237, the case 21 may be made of material through which visible light may pass, or light transmission holes (not shown) are provided in positions, corresponding to the indicators, of the case 21, such that visible light emitted by the indicators is exposed out of the case 21 to provide prompts to the user.

The timer 232 records press time of the touch button 233 and outputs an indication signal according to the press time. The control module 23 outputs a corresponding control signal according to the indication signal to turn on, turn off or control operation of the UV module 22, the status indicator 234, or the charging indicator 237.

In one embodiment, in the state that the UV sterilization device 20 is not started, when the press time of the touch button 233 recorded by the timer 232 reaches a preset period of time (for example, but not limited to 4 seconds, or more than 4 seconds), and the rechargeable battery 235 is sufficient to drive the UV module 22 and the control module 23 to operate, an indication signal is output, the control module 23 outputs a corresponding control signal to turn on the UV module 22 according to the indication signal, so as to irradiate UV light L to the object O in the box body 11 for sterilization, and at the same time, the status indicator 234 (with a light color being, for example, but not limited to, red, green, and blue) is turned on (for example, but not limited to normally on or flashing) to remind the user that the sterilization function is enabled manually.

In another embodiment, in the state that the UV sterilization device 20 is started, when the press time of the touch button 233 recorded by the timer 232 reaches a preset period of time (for example, but not limited to 1 second, or within 1 second), an indication signal is output, the control module 23 outputs a corresponding control signal to turn off the UV module 22 according to the indication signal, so as to stop irradiating UV light L to the box body 11, and at the same time, the status indicator 234 (with the light color being, for example, but not limited to, red, green, and blue) is turned on (for example, but not limited to normally on or flashing) to remind the user that the sterilization function is disenabled manually.

In still another embodiment, in the state that the UV sterilization device 20 is started, when the UV sterilization device 20 has been started for a default period of time (for example, but not limited to 60 seconds), an indication signal is output, the control module 23 outputs a corresponding control signal to turn off the UV module 22 according to the indication signal, so as to stop irradiating UV light L to the box body 11, and at the same time, the status indicator 234 (with the light color being, for example, but not limited to red, green, and blue) is turned on (for example, but not limited to normally on or flashing) to remind the user that the sterilization function is disenabled automatically.

In yet another embodiment, in the state that the UV sterilization device 20 is not started, when the timer 232 records that the lid 12 has been in the flat state for a preset period of time (for example, but not limited to 3 hours, or more than 3 hours), and the rechargeable battery 235 is sufficient to drive the UV module 22 and the control module 23 to operate, an indication signal is output, the control module 23 outputs a corresponding control signal to turn on the UV module 22 according to the indication signal, so as to irradiate UV light L to the object O in the box body 11 for sterilization, and at the same time, the status indicator 234 (with the light color being, for example, but not limited to, red, green, and blue) is turned on (for example, but not limited to normally on or flashing) to remind the user that the sterilization function is enabled automatically.

In yet another embodiment, the electrical port 236 is electrically connected to an external power source via a charging cable (not shown) to introduce power to the rechargeable battery 235 for charging, and at the same time, the control module 23 outputs a control signal to turn on the charging indicator. The user is reminded that charging is in progress by turning on (for example, but not limited to, normally on or flashing) the charging indicator 237 (with a light color being, but not limited to, red, green and blue). Upon completion of the charging of the rechargeable battery 235, the control module 23 outputs a control signal to adjust the charging indicator 237, and the light color and/or lighting state of the charging indicator 237 is different from the form indicating that charging is in progress, so as to remind the user that charging is completed.

In yet another embodiment, in the state that the UV sterilization device 20 is not started, when the press time of the touch button 233 recorded by the timer 232 reaches a preset period of time (for example, but not limited to 4 seconds, or more than 4 seconds), and the rechargeable battery 235 is insufficient to drive the UV module 22 and the control module 23 to operate, an indication signal is output, the control module 23 outputs a corresponding control signal according to the indication signal to turn on (for example, but not limited to normally on or flashing) the charging indicator 237 (with the light color being, for example, but not limited to, red, green, and blue), so as to remind the user that the battery is low and needs to be charged.

Figure 6:
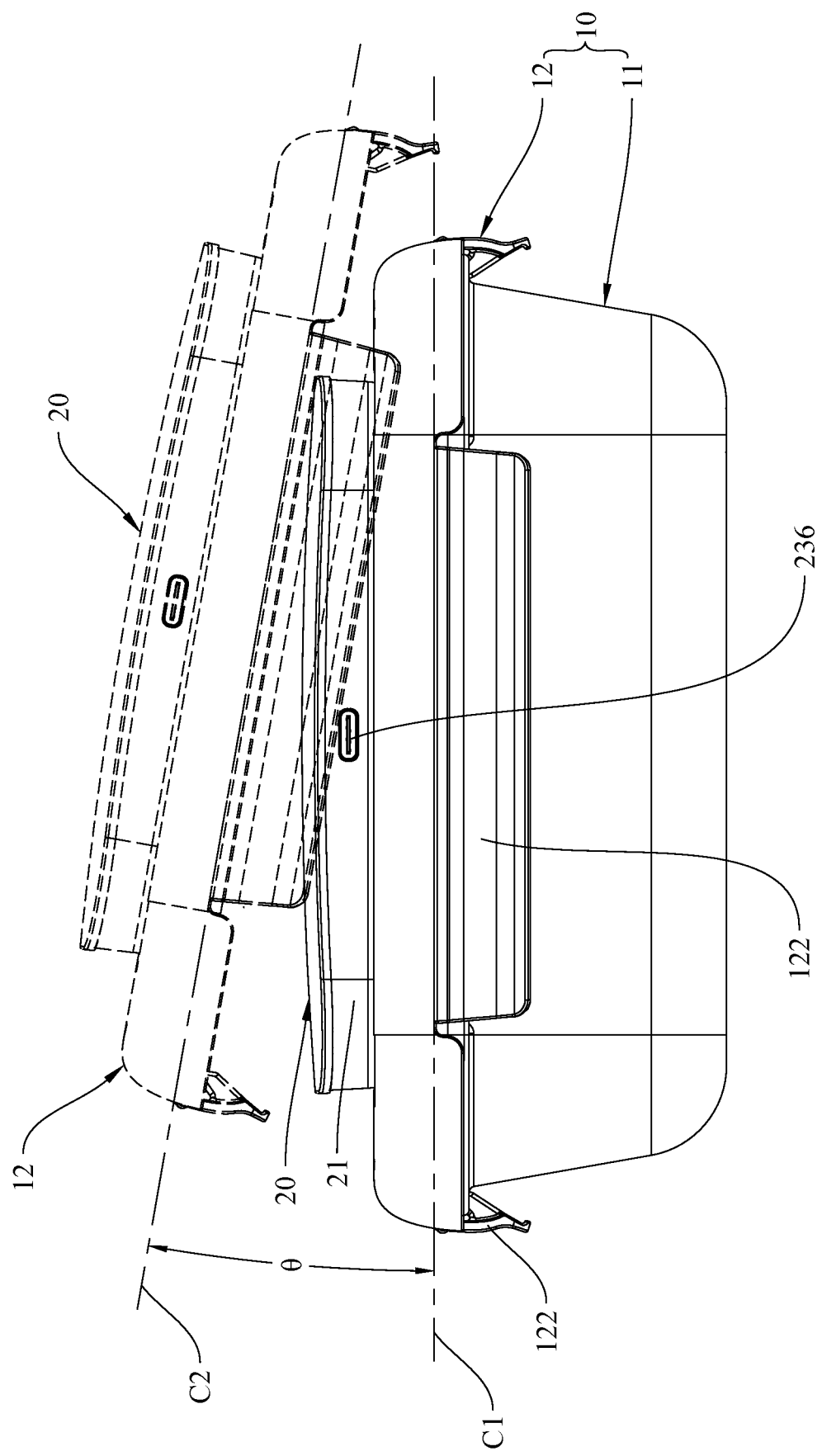
FIG. 6 is a second schematic diagram of a use state of a UV sterilization fresh-keeping box according to the present invention.

Please also refer to FIG. 6 for a second schematic diagram of the use state of the UV sterilization fresh-keeping box according to the present invention, and refer to FIG. 4 again, as shown in the figures.

The UV sterilization device 20 further includes a tilt sensor 238 electrically connected to the control module 23. The tilt sensor 238 outputs an indication signal when detecting that the lid 12 tilts from a flat state to a default angle θ, and the control module 23 outputs a corresponding control signal to close the UV module 22 according to the indication signal, thus preventing the UV module 22 from emitting UV light L to irradiate the user when the user opens the lid 12 or when the entire UV sterilization fresh-keeping box 100 tilts. The preset angle θ is an angle between an axis C1 of the lid 12 in the flat state and an axis C2 of the lid 12 in the tilting state. The preset angle θ is, for example, but not limited to, 10 degrees to 45 degrees, preferably 20-30 degrees. Thus, when the user opens the lid 12 or the UV sterilization fresh-keeping box 100 tilts, the UV module 22 may be automatically turned off to avoid irradiation of the UV light L to the user or a third person. The flat state indicates that the bottom side of the box body 11 is parallel to a placement plane (a platform surface such as a tabletop and a countertop). The lid 12 that is opened and tilted is represented by the dashed line in FIG. 6. In addition, when the entire UV sterilization fresh-keeping box 100 tilts or is turned over and the tilting state of the lid 12 meets the preset angle θ, the control module 23 also automatically turns off the UV module 22.

To sum up, according to the present invention, the removable UV sterilization device is combined to the top side of the accommodating box, and sterilizes the object in the accommodating box without contact, thus ensuring food hygiene; and the UV sterilization device can be removed when the accommodating box is cleaned, thus preventing the electronic components from getting wet.

The present invention has been described in detail above, however, the above is only one of preferred embodiments of the present invention, and is not intended to limit the scope of implementation of the present invention. That is, all changes and modifications made in accordance with the patent scope of the present invention shall fall within the patent scope of the present invention.

The invention claimed is:

1. A UV sterilization fresh-keeping box, comprising:
   an accommodating box, the accommodating box comprising a box body with a storage space, and a lid disposed on the box body and sealing the storage space, the lid having a light transmission part to allow UV to pass through, and a first assembling part disposed on a peripheral side of the light transmission part; and
   a UV sterilization device, removably disposed on a top side of the accommodating box, the UV sterilization device comprising a case, a UV module disposed in the case, a control module electrically connected to the UV module, and a second assembling part disposed on a bottom side of the case, the UV sterilization device being mounted onto the lid by combining the second assembling part with the first assembling part, the UV module being controlled by the control module to emit UV light towards the light transmission part, so as to sterilize the storage space,
   wherein the control module comprises a control circuit board, a timer electrically connected to the control circuit board, a touch button, and a status indicator, the touch button and the status indicator are disposed on a top side of the case, the timer records press time of the touch button and outputs an indication signal according to the press time, and the control module outputs a corresponding control signal according to the indication signal to turn on, turn off or control the UV module and the status indicator.

2. The UV sterilization fresh-keeping box according to claim 1, wherein the light transmission part is made of a cyclic block copolymer (CBC).

3. The UV sterilization fresh-keeping box according to claim 1, wherein the UV module comprises a light panel, at least one UV LED electrically disposed on the light panel, and a light transmission sheet disposed in a UV emitting direction of the UV LED.

4. The UV sterilization fresh-keeping box according to claim 3, wherein the light transmission sheet is made of a cyclic block copolymer (CBC).

5. The UV sterilization fresh-keeping box according to claim 3, wherein the UV LED is a UVC LED.

6. The UV sterilization fresh-keeping box according to claim 5, wherein a wavelength of the UV ranges from 220 nm to 280 nm.

7. The UV sterilization box according to claim 1, wherein the UV sterilization device further comprises a tilt sensor electrically connected to the control module, the tilt sensor outputs an indication signal when detecting that the lid tilts from a flat state to a default angle, and the control module outputs a corresponding control signal to close the UV module according to the indication signal.

8. The UV sterilization fresh-keeping box according to claim 1, wherein the control module comprises a rechargeable battery electrically connected to the control circuit board, an electrical port, and a charging indicator, the electrical port and the charging indicator are disposed on one side of the case, an external power supply is electrically connected to the electrical port to introduce power to the rechargeable battery, and the control module outputs a control signal to turn on the charging indicator.

9. The UV sterilization fresh-keeping box according to claim 8, wherein the rechargeable battery is a lithium battery.

\* \* \* \* \*